Sept. 18, 1945.  A. E. ANDERSON  2,385,181
SYSTEMS OF ELECTRIC DISTRIBUTION
Filed March 31, 1943

Inventor:
Arvid E. Anderson,
by Harry E. Dunham
His Attorney.

Patented Sept. 18, 1945

2,385,181

UNITED STATES PATENT OFFICE 2,385,181

SYSTEM OF ELECTRIC DISTRIBUTION

Arvid E. Anderson, Haverford Township, Delaware County, Pa., assignor to General Electric Company, a corporation of New York Application March 31, 1943, Serial No. 481,318

13 Claims. (Cl. 171—118)

My invention relates to systems of electric distribution and particularly to such a system in which two alternating current circuits are arranged to be interconnected when one of the circuits is deenergized and the other is energized and, also, when both of the circuits are simultaneously energized and a predetermined phase and magnitude relation exists between the voltages of the two circuits.

My invention relates particularly to an arrangement for automatically controlling the phase and magnitude relation of the voltages of two alternating current circuits by means of suitable adjustable transforming means so that the voltages of the two circuits can be brought into the proper phase and magnitude relation to prevent excessive circulating currents from flowing between the two circuits when the circuit breaker interconnecting the two circuits is closed.

Figure 1:
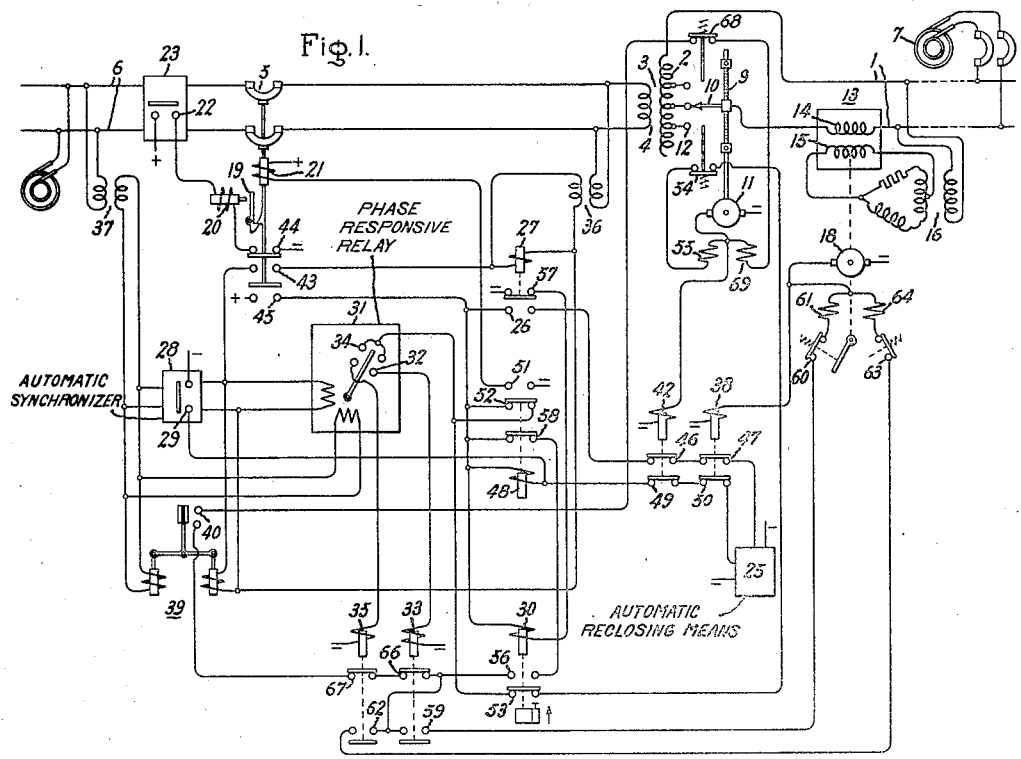
Figure 2:
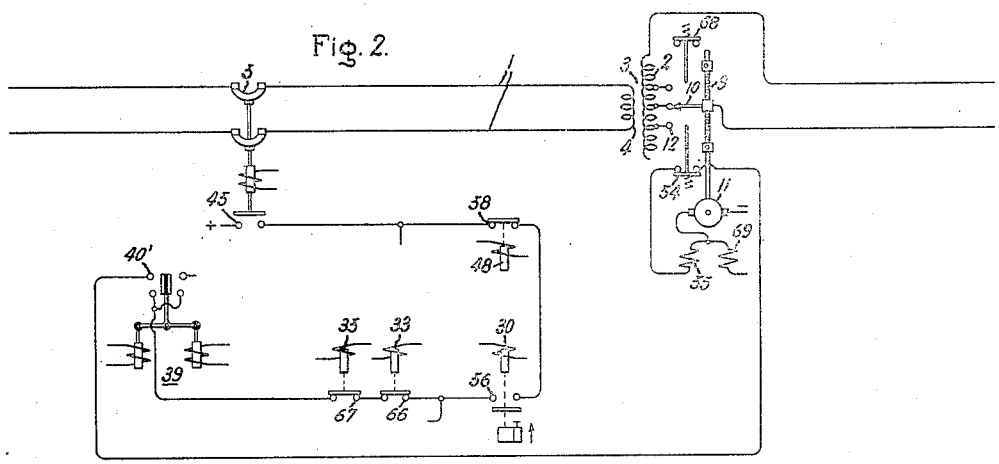
Figure 3:
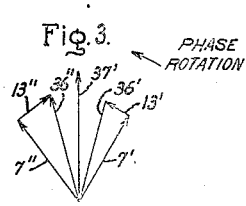

My invention will be better understood from the following description when taken in connection with the accompanying drawing, Fig. 1 of which illustrates a system of electric distribution embodying my invention, Fig. 2 of which illustrates a modification of the embodiment shown in Fig. 1, and Fig. 3 of which is an explanatory vector diagram, and the scope of my invention will be pointed out in the appended claims.

Referring to Fig. 1 of the accompanying drawing, I have shown a system of alternating current electric distribution comprising a load circuit 1 which is connected to a winding 2 of a power transformer 3, a second winding 4 of which is connected by means of a suitable circuit breaker 5 to an alternating current supply circuit 6. The load circuit 1 is also arranged to be energized with current from another source of current, such as 7, which is maintained in synchronism, in any suitable manner well known in the art but not shown in the drawing, with the source or sources that supply current to the supply circuit 6. Due to system conditions, such as the different line impedances between the various sources and the point in the load circuit where circuit breaker 5 is located, it will be apparent to one skilled in the art that the circuit voltages on the opposite sides of the circuit breaker 5 when it is open may be out of phase and of unequal magnitude although the sources are in synchronism. Unequal loading or differences in loading characteristics of the sources will also contribute to this result.

In order to simplify the disclosure, I have shown the supply circuit 6 and the load circuit 1 as single phase circuits, but it will be obvious that my invention is applicable to circuits of any number of phases.

For changing the ratio of voltage transformation of the power transformer 3, I have shown a tap changing mechanism 9 having a movable contact 10 which is adapted to be moved by means of a reversible motor 11 into engagement with a number of taps 12 provided on the transformer winding 2. For regulating the phase relation of the voltages of the supply circuit 6 and the load circuit 1, I provide in one of the circuits an adjustable transformer 13 of a suitable type to produce a voltage of variable magnitude which is displaced in phase relative to the voltage impressed across the circuit 1 by the transformer 3 or the other sources that may be supplying current to the circuit. Such an adjustable transformer may be of the tap changing type, similar to that shown in connection with the power transformer 3 or of the induction regulator type. In the particular embodiment shown in Fig. 1, the adjustable transformer 13 is shown as an induction regulator having one winding 14 connected in series relation with the winding 2 of the power transformer 3 and another winding 15 connected across the load circuit 1 by means of a suitable phase shifter 16 of any suitable type, examples of which are well known in the art, so that the voltage induced in the winding 15 is displaced 90 degrees, or approximately this amount, from the voltage across the load circuit 1. The ratio of voltage transformation of the transformer 13, as well as the direction of the induced voltage, are changed in a well-known manner by varying the position of one of the windings thereof relative to the other winding by means of a reversible motor 18.

While I have shown separate transforming means 3 and 13 for respectively varying the relative magnitude and phase relation of the voltages of the circuits 1 and 6, it will be evident to those skilled in the art that a single transformer such as shown in United States Letters Patent Nos. 1,722,181 and 1,745,159 and assigned to the assignee of this application may be employed to vary the relative magnitude and phase relation of the voltages.

As shown in the drawing, the circuit breaker 5 is of the well-known latched closed type having a latch 19 for holding the circuit breaker in its closed position, a trip coil 20 for releasing the latch when it is desired to effect an opening of the circuit breaker, and a closing coil 21 which, when energized, effects the closing of the circuit breaker. The energizing circuit for the trip coil 20 is arranged to be completed by the contacts 22 of suitable fault responsive means 23 which is connected to the supply circuit 6 in any suitable manner so as to effect the closing of the contacts 22 when the circuit breaker 5 is closed and a fault of a predetermined character occurs in the transformer 3 or circuit 1.

For effecting the reclosing of the circuit breaker 5 when it is open and the load circuit 1 is not energized, I provide suitable automatic reclosing means 25 which is arranged to effect the completion of an energizing circuit for the closing coil 21 of the circuit breaker 5 when the circuit breaker is open and the load circuit voltage is below a predetermined value so that the contacts 26 of a voltage relay 27, which is responsive to the voltage across the load circuit 1, are closed. Since such automatic reclasing means are well known in the art and the details thereof form no part of my present invention, I have represented the automatic reclosing means 25 by a suitably labeled rectangle.

For effecting the closing of the circuit breaker 5 when it is open and the load circuit 1 is energized at some other point so that the contacts 26 of the load circuit voltage relay 27 are open, I provide a suitable automatic synchronizer 28 which is arranged to close its contacts 29 and effect the completion of an energizing circuit for the closing coil 21 of the circuit breaker 5 when the circuit breaker is open and the magnitude and phase differences of the voltages across the supply circuit and load circuit terminals of the circuit breaker 5 are less than predetermined values. Since such automatic synchronizers are well known in the art and the details thereof form no part of my present invention, I have represented the automatic synchronizer 28 by a suitably labeled rectangle.

In order to bring the magnitude and phase differences of these voltages within these predetermined values while the circuit breaker 5 is open and the load circuit 1 is energized, I provide, in accordance with my invention, suitable means for adjusting the transformers 3 and 13 in the proper manner to accomplish this result. In the particular embodiment of my invention shown in the drawing, I provide an arrangement which, after the circuit breaker 5 has been open for a predetermined time, first adjusts the transformer 13 to establish the desired phase relation between the voltages of the circuit 6 and the winding 4 of the transformer 3 in the circuit 1 and then adjusts the transformer 3 to establish the desired magnitude relation between these voltages as long as the desired phase relation is maintained. This particular arrangement includes a time relay 30, which is set into operation by the opening of the circuit breaker 5, and a phase responsive relay 31, which is arranged to close its contacts 32 and complete an energizing circuit for an associated control relay 33 when a predetermined phase relation exists between the voltages of the circuit 6 and the transformer winding 4 and to close its contacts 34 and complete an energizing circuit for an associated relay 35 when a different predetermined phase relation exists between these voltages. For the purpose of this description, it will be assumed that the relay 31 is so connected to the circuits 6 and the transformer winding 4 by the isolating transformers 36 and 37, respectively, that the contacts 32 are closed when the secondary voltage of the transformer 37 leads the secondary voltage of the transformer 36 and the contacts 34 are closed when the secondary voltage of the transformer 37 lags the secondary voltage of the transformer 36. The relay 33, when energized, is arranged to complete an operating circuit for the motor 18 so as to cause it to rotate in a direction to effect a decrease in the lag of the load circuit voltage, with respect to the supply circuit voltage, at the point where the circuit breaker 5 is located, and the relay 35, when energized, is arranged to complete an operating circuit for the motor 18 so as to cause it to rotate in the opposite direction and thereby effect a decrease in the lead of the load circuit voltage relative to the supply circuit voltage at the point where the circuit breaker 5 is located. A control relay 38 is connected in parallel with the armature winding of the motor 18 and is provided with suitable contacts in the circuits of the automatic reclosing means 25 so as to render the automatic reclosing means inoperative to effect a reclosure of the circuit breaker 5 while the transformer 13 is being adjusted.

When the control relays 33 and 35 are simultaneously deenergized thereby indicating that there is no need of adjusting the transformer 13 and, therefore, the circuit voltages at the opposite ends of the open circuit breaker 5 are in phase, the transformer 3 is then adjusted to equalize the magnitudes of the two voltages. This result is accomplished by means of a voltage differential relay 39 which, when the voltage of the supply circuit 6 exceeds the voltage of the transformer winding 4, closes its contacts 40 and completes an operating circuit for the motor 11 so as to cause it to rotate in the proper direction to increase the voltage of the transformer winding 4. In order to insure that the magnitude of the voltage of the transformer winding 4 is lower than the magnitude of the supply circuit voltage at the time the differential relay 39 is rendered operative to control the adjustment of the transformer 3, I provide an arrangement for controlling the circuit of the motor 11, in the embodiment shown in Fig. 1, so that this motor 11 is operated to effect the adjustment of the transformer 3 to its minimum voltage position when the circuit breaker 5 is open and the time relay 30 is in its deenergized position. A suitable control relay 42 is connected in parallel with the armature winding of the motor 11 and is provided with suitable contacts in the circuits of the automatic reclosing means 25 so as to render this automatic reclosing means inoperative to effect a reclosure of the circuit breaker 5 while the transformer 3 is being adjusted.

The operation of the embodiment of my invention shown in Fig. 1 is as follows: When the circuit breaker 5 is closed and the supply circuit 6 is supplying current to the load circuit 1 under normal load conditions, the various control devices are in the positions in which they are shown in the drawing. The motor 11 for the adjustable transformer 3 may be controlled in any suitable manner, not shown but well known to those skilled in the art, so that the voltage of the load circuit 1 is maintained at a predetermined value.

Upon the occurrence of a fault which causes the fault responsive means 23 to close its contacts 22, an energizing circuit is completed for the trip coil 20 through the auxiliary contacts 44 of the circuit breaker 5 to effect the opening of the circuit breaker and the disconnection of the supply circuit 6 from the load circuit 1. The closing of the contacts 43 of the circuit breaker 5 connects the secondary winding of the isolating transformer 36 to the automatic synchronizer 26, the phase responsive relay 31 and the voltage differential relay 39 to render them operative in accordance with the voltage across the transformer winding 4.

If the fault also effects the disconnection of all of the other sources from the load circuit 1, the load circuit voltage decreases to zero and causes the voltage relay 27 to close its contacts 26 and complete a starting circuit for the automatic reclosing means 25 through the contacts 45 of the circuit breaker 5, the contacts 46 of the relay 42, and the contacts 47 of the relay 38. The automatic reclosing means 25 then operates in a manner well known in the art to establish an energizing circuit for the control relay 48 through the contacts 45 of the circuit breaker 5, the contacts 49 of the relay 42, and the contacts 50 of the relay 38. The closing of the contacts 51 of the relay 48 completes an energizing circuit for the closing coil 21 to effect the reclosing of the circuit breaker 5.

If, however, the load circuit 1 is energized from some other source, such as 7, after the circuit breaker 5 is opened, the load circuit voltage relay 27 by maintaining its contacts 26 open, prevents the automatic reclosing means 25 from effecting a reclosure of the circuit breaker 5 and by maintaining its contacts 57 closed establishes through contacts 45 of the circuit breaker 5 an energizing circuit for the time relay 30. Before the time relay 30, however, completes its timing operation, a circuit is completed for the motor 11 of the adjustable transformer 3 through the contacts 45 of the circuit breaker 5, the contacts 52 of the relay 48, the contacts 53 of the relay 30, the limit switch 54 of the transformer 3, and the field winding 55 and the armature winding of the motor 11 to cause the motor 11 to move the adjustable transformer 3 to its minimum voltage position, in which position the limit switch 54 is open. When the time relay 30 completes its timing operation, it opens its contacts 53 and closes its contacts 56. The closing of the contacts 56 renders the phase responsive relay 31 operative to control the adjustable transformer 13. If the phase relation of the supply and load circuit voltages is such that the secondary voltage of the transformer 37 leads the secondary voltage of the transformer 36 and the contacts 32 of the relay 31 are closed, an energizing circuit is completed for the control relay 33 through the contacts 45 of the circuit breaker 5 and the contacts 52 of the relay 48. If, however, the phase relation of the supply and load circuit voltages is such that the secondary voltage of the transformer 37 lags the secondary voltage of the transformer 36 and the contacts 34 of the relay 31 are closed, an energizing circuit is completed for the control relay 35 through the contacts 45 of the circuit breaker 5 and the contacts 52 of the relay 48. If the supply circuit and load circuit voltages are in phase, the contacts 32 and 34 of the relay 31 are both open so that the relays 33 and 35 are simultaneously deenergized.

When the relay 33 is energized, a circuit is completed for the motor 18 through the contacts 45 of the circuit breaker 5, the contacts 58 of the relay 48, the contacts 56 of the relay 30, the contacts 59 of the relay 33, the limit switch 60, and the field winding 61 and armature winding of the motor 18 so that the transformer 13 is adjusted to change the phase of the load circuit voltage so as to decrease the phase difference of the secondary voltages of the isolating transformers 36 and 37. When the relay 35 is energized, a circuit is completed for the motor 18 through the contacts 45 of the circuit breaker 5, the contacts 58 of the relay 48, the contacts 56 of the relay 30, the contacts 62 of the relay 35, the limit switch 63, and the field winding 64 and armature winding of the motor 18 so that the transformer 13 is adjusted to change the phase of the load circuit voltage so as to decrease the phase difference of the secondary voltages of the isolating transformers 36 and 37. While the motor 18 is in operation the relay 38, which is connected in parallel with the armature winding of the motor 18, maintains its contacts 47 and 30 open, thereby preventing operation of the automatic reclosing means 25.

From the vector diagram shown in Fig. 3, it will be evident how the desired phase relation of the secondary voltages of the transformers 36 and 37 is obtained by adjusting the transformer 13 under the control of the phase responsive relay 31. In this Fig. 3, the vector 37' represents the secondary voltage of the transformer 37, and the vector 36' represents a secondary voltage of the transformer 36 lagging the secondary voltage of the transformer 37. The vector 36' is shown as being the resultant of a vector 7' representing the voltage supplied to the load circuit by the source 7 and a vector 13' representing the induced voltage of the transformer 13 and leading the source voltage 7 by 90 degrees. The phase responsive relay 31 is so arranged that when the vector 36' lags the vector 37', the relay 31 by energizing the relay 33 causes the transformer 13 to be adjusted so as to increase the length of the vector 13' until the vectors 36' and 37' coincide.

In Fig. 3, I have also shown a vector 36" which represents a secondary voltage of the transformer 36 that leads the secondary voltage of the transformer 37 and which is the resultant of a vector 7" representing the voltage applied across the load circuit 1 by the source 7 and a vector 13" representing the induced voltage of the transformer 13 and lagging the source voltage 7 by 90 degrees. Since the vector 36" leads the vector 37', the phase responsive relay 31 effects the energization of the control relay 35 and thereby causes the transformer 13 to be adjusted so as to increase the length of the vector 13" until the vectors 36" and 37' coincide.

When the transformer 13 has been adjusted so that the secondary voltages of the transformers 36 and 37 are in phase and the control relays 33 and 35 are simultaneously deenergized, a circuit is completed for the motor 11 through the contacts 45 of the circuit breaker 5, the contacts 58 of the relay 48, the contacts 56 of the relay 30, the contacts 66 of the relay 33, the contacts 67 of the relay 35, the contacts 40 of the relay 39, the limit switch 68, and the field winding 69 and armature winding of the motor 11. This circuit causes the motor 11 to adjust the transformer 3 in such a manner as to increase the magnitude of the secondary voltage of the transformer 36 until it is equal to the voltage of the secondary winding of the transformer 37. The automatic synchronizer 28 may then close its contacts 29 and complete, through the contacts 45 of the circuit breaker 5, an energizing circuit for the control relay 48 which, in turn, by closing its contacts 51, completes an energizing circuit for the closing coil 21 to close the circuit breaker 5.

The increase in voltage by the operation of mechanism 9, in effect increases the length of vector 7' or 7'' only. If this operation takes place after 36' or 36'' coincides with 37', and without the subsequent operation of automatic synchronizer 28, relays 31 and 40 will repeat the above-mentioned operations until vectors 36' or 36'' and 37' are within the operating range of relay 28.

While the motor 11 is in operation a circuit is also completed for the relay 42 which is connected in parallel with the armature winding of the motor 11 so that the contacts 46 and 49 interrupt the control circuits to the automatic reclosing means 25.

In the modification of Fig. 1 shown in Fig. 2, I have illustrated an arrangement for effecting the phase adjustment of the secondary voltage of the transformer 36 without first reducing the magnitude thereof to a predetermined value. This result is accomplished by omitting the contacts 53 of the relay 30 (shown in Fig. 1) and connecting the circuit of the field winding 55 and armature winding of the motor 11 so that it includes the contacts 45 of the circuit breaker 5, the contacts 58 of the relay 43, the contacts 56 of the relay 30, the contacts 66 of the relay 33, the contacts 67 of the relay 35, and the contacts 49' of the relay 39 which are closed when the magnitude of the secondary voltage of the transformer 36 is greater than the magnitude of the secondary voltage of the transformer 37. Therefore, it will be seen that in the modification shown in Fig. 2 the transformer 3 is not adjusted until after the circuit breaker 5 has been open for a sufficient length of time to pick up the relay 30 and the phase adjustment has been made so as to bring the secondary voltages of the transformers 36 and 37 into phase. Then, the transformer 3 is adjusted under the control of the voltage differential relay 39 to equalize the magnitudes of the secondary voltages of the transformers 36 and 37.

While I have, in accordance with the Patent Statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, two energized alternating current circuits, adjustable transforming means for varying the magnitude of the voltage at a predetermined point of one of said circuits and for varying the phase relation between said voltage and a voltage at a predetermined point of the other circuit, and means controlled by said voltages for automatically adjusting said transforming means so as to establish a predetermined magnitude and phase relation between said voltages.

2. In combination, two energized alternating current circuits, a circuit breaker for interconnecting said circuits, adjustable transforming means for varying the voltage at a predetermined point of one of said circuits and for varying the phase relation between said voltage and a voltage at a predetermined point of the other circuit, means controlled by said voltages for adjusting said transforming means so as to establish a predetermined magnitude and phase relation between said voltages, and means responsive to said predetermined magnitude and phase relation between said voltages for closing said circuit breaker.

3. In combination, two energized alternating current circuits, a circuit breaker for interconnecting said circuits, adjustable transforming means for varying the magnitude and phase relation of the circuit voltages on opposite sides of said circuit breaker, means controlled by said voltages for adjusting said transforming means so as to establish a predetermined magnitude and phase relation between said voltages, and means responsive to said predetermined magnitude and phase relation between said voltages for closing said circuit breaker.

4. In combination, two energized alternating current circuits, a circuit breaker interconnecting said circuits, fault responsive means for effecting the opening of said circuit breaker, adjustable transforming means in one of said circuits for varying the phase relation of the voltages of the disconnected circuits, means responsive to the opening of said circuit breaker for controlling said transforming means in response to the phase relation of said voltages so as to establish a predetermined phase relation of said voltages, and automatic synchronizing means controlled by the phase relation of said voltages for closing said circuit breaker.

5. In combination, two energized alternating current circuits, a circuit breaker interconnecting said circuits, fault responsive means for effecting the opening of said circuit breaker, adjustable transforming means in one of said circuits for varying the phase relation of the voltages of the disconnected circuits, means responsive to the opening of said circuit breaker for controlling said transforming means in response to the phase relation of said voltages so as to establish a predetermined phase relation of said voltages, means responsive to the establishment of said predetermined phase relation of said voltages for controlling said transforming means to establish a predetermined magnitude relation of said voltages, and automatic synchronizing means controlled by the phase and magnitude relation of said voltages for closing said circuit breaker.

6. In combination, two energized alternating current circuits, a circuit breaker interconnecting said circuits, fault responsive means for effecting the opening of said circuit breaker, adjustable transforming means in one of said circuits for producing therein a variable voltage displaced a predetermined amount from the voltage across said circuit, means responsive to the opening of said circuit breaker for controlling said transforming means in response to the phase relation of the circuit voltages on opposite sides of said circuit breaker for establishing a predetermined phase relation of said circuit voltages, and automatic synchronizing means controlled by the phase relation of said circuit voltages for closing said circuit breaker.

7. In combination, two energized alternating current circuits, a circuit breaker interconnecting said circuits, fault responsive means for effecting the opening of said circuit breaker, adjustable transforming means in one of said circuits for producing therein a variable voltage displaced a predetermined amount from the voltage across said circuit, means responsive to the opening of said circuit breaker for controlling said transforming means in response to the phase relation of the circuit voltages on opposite sides of said circuit breaker for establishing a predetermined phase relation of said circuit voltages, other adjustable transforming means in one of said circuits for varying the relative magnitudes of the circuit voltages on opposite sides of said circuit breaker, means responsive to the establishment of said predetermined phase relation of said circuit voltages for controlling said other adjustable transforming means to establish a predetermined magnitude relation of said voltages, and automatic synchronizing means controlled by the phase and magnitude relation of said circuit voltages for closing said circuit breaker.

8. In combination, two energized alternating current circuits, a circuit breaker interconnecting said circuits, fault responsive means for effecting the opening of said circuit breaker, adjustable transforming means in one of said circuits for varying the phase relation of the voltages of said circuits, means responsive to the opening of said circuit breaker and the voltage of a predetermined one of said circuits being below a predetermined value for effecting the reclosure of said circuit breaker independently of the phase relation of said circuit voltages, means responsive to the opening of said circuit breaker and the voltage of said predetermined one of said circuits being above a predetermined value for controlling said transforming means in response to the phase relation of said circuit voltages to establish a predetermined phase relation of said circuit voltages, and automatic synchronizing means controlled by the phase relation of said circuit voltage for closing said circuit breaker.

9. In combination, two energized alternating current circuits, a circuit breaker interconnecting said circuits, fault responsive means for effecting the opening of said circuit breaker, adjustable transforming means in one of said circuits for varying the phase relation of the voltages of said circuits, means responsive to the opening of said circuit breaker and the voltage of a predetermined one of said circuits being below a predetermined value for effecting the reclosure of said circuit breaker independently of the phase relation of said circuit voltages, means responsive to the opening of said circuit breaker and the voltage of said predetermined one of said circuits being above a predetermined value for controlling said transforming means in response to the phase relation of said circuit voltages to establish a predetermined phase relation of said circuit voltages, means responsive to the establishment of said predetermined phase relation of said circuit voltages for controlling said transforming means to establish a predetermined magnitude relation of said voltages, and automatic synchronizing means controlled by the phase and magnitude relation of said voltages for closing said circuit breaker.

10. In combination, two energized alternating current circuits, a circuit breaker interconnecting said circuits, fault responsive means for effecting the opening of said circuit breaker, adjustable transforming means in one of said circuits for varying the phase relation of the voltages of said circuits, means responsive to the opening of said circuit breaker and the voltage of a predetermined one of said circuits being below a predetermined value for effecting the reclosure of said circuit breaker independently of the phase relation of said circuit voltages, means responsive to the opening of said circuit breaker and the voltage of said predetermined one of said circuits being above a predetermined value for controlling said transforming means in response to the phase relation of said circuit voltages to establish a predetermined phase relation of said circuit voltages, other transforming means in one of said circuits for varying the magnitude of the voltage thereof, means responsive to said predetermined phase relation of said circuit voltages for controlling said other transforming means to establish a predetermined magnitude relation of said circuit voltages, and automatic synchronizing means controlled by the phase and magnitude relation of said circuit voltages for closing said circuit breaker.

11. In combination, two energized alternating current circuits, a circuit breaker interconnecting said circuits, fault responsive means for effecting the opening of said circuit breaker, adjustable transforming means in one of said circuits for varying the phase and magnitude relation of the voltages of said circuits, means responsive to the opening of said circuit breaker for effecting the operation of said transforming means to decrease the magnitude of the associated circuit voltage and then the operation of said transforming means to establish a predetermined phase relation of the voltages of said circuits, means responsive to the establishment of said predetermined phase relation of said voltages for controlling said transforming means to establish a predetermined magnitude relation of said circuit voltages, and automatic synchronizing means controlled by the phase and magnitude relation of said circuit voltages for closing said circuit breaker.

12. In combination, two energized alternating current circuits, a circuit breaker interconnecting said circuits, fault responsive means for effecting the opening of said circuit breaker, adjustable transforming means in one of said circuits for varying the phase and magnitude relation of the voltages of said circuits, means responsive to the opening of said circuit breaker and the voltage of a predetermined one of said circuits being below a predetermined value for effecting the reclosure of said circuit breaker independently of the phase relation of said circuit voltages, means responsive to the opening of said circuit breaker and the voltage of said predetermined one of said circuits being above a predetermined value for effecting the operation of said transforming means to decrease the magnitude of the associated circuit voltage and then the operation of said transforming means to establish a predetermined phase relation of the voltages of said circuits, means responsive to the establishment of said predetermined phase relation of said voltages for controlling said transforming means to establish a predetermined magnitude relation of said circuit voltages, and automatic synchronizing means controlled by the phase and magnitude relation of said circuit voltages for closing said circuit breaker.

13. In combination, two energized alternating current circuits, a circuit breaker interconnecting said circuits, fault responsive means for effecting the opening of said circuit breaker, adjustable transforming means in one of said circuits for varying the phase relation of the voltages of said circuits, means responsive to the opening of said circuit breaker and the voltage of a predetermined one of said circuits being below a predetermined value for effecting the reclosure of said circuit breaker independently of the phase relation of said circuit voltages, other transforming means in one of said circuits for varying the magnitude of the voltage thereof, means responsive to the opening of said circuit breaker and the voltage of said predetermined one of said circuits being above a predetermined value for first effecting the operation of said other transforming means to decrease the magnitude of the associated circuit voltage and then the operation of said first mentioned transforming means to establish a predetermined phase relation of said circuit voltages, means responsive to said predetermined phase relation of said circuit voltages for controlling said other transforming means to establish a predetermined magnitude relation of said circuit voltages, and automatic synchronizing means controlled by the phase and magnitude relation of said circuit voltages for closing said circuit breaker.

ARVID E. ANDERSON.